(12) United States Patent
Wilkinson

(10) Patent No.: US 12,467,628 B1
(45) Date of Patent: Nov. 11, 2025

(54) TURBINE ENGINE HAVING A COMBUSTION SECTION

(71) Applicant: GENERAL ELECTRIC COMPANY, Evendale, OH (US)

(72) Inventor: Keith W. Wilkinson, Portsmouth, NH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/886,348

(22) Filed: Sep. 16, 2024

(51) Int. Cl.
| | |
|---|---|
| F23R 3/28 | (2006.01) |
| F01D 9/06 | (2006.01) |
| F02C 3/04 | (2006.01) |
| F02C 7/22 | (2006.01) |
| F02C 7/228 | (2006.01) |
| F23R 3/00 | (2006.01) |
| F23R 3/26 | (2006.01) |
| F23R 3/34 | (2006.01) |
| F23R 3/50 | (2006.01) |

(52) U.S. Cl.
CPC .............. *F23R 3/002* (2013.01); *F01D 9/065* (2013.01); *F02C 3/04* (2013.01); *F02C 7/22* (2013.01); *F02C 7/222* (2013.01); *F02C 7/228* (2013.01); *F23R 3/26* (2013.01); *F23R 3/28* (2013.01); *F23R 3/34* (2013.01); *F23R 3/50* (2013.01)

(58) Field of Classification Search
CPC .... F01D 9/065; F02C 3/04; F02C 7/22; F02C 7/222; F02C 7/228; F23R 3/002; F23R 3/26; F23R 3/28; F23R 3/34; F23R 3/50
See application file for complete search history.

(56) References Cited

U.S. PATENT DOCUMENTS

| | | | |
|---|---|---|---|
| 4,922,710 A | 5/1990 | Rowen et al. | |
| 5,555,721 A | 9/1996 | Bourneuf et al. | |
| 5,619,855 A * | 4/1997 | Burrus | F23R 3/20 60/737 |
| 8,171,738 B2 | 5/2012 | Fish et al. | |
| 8,438,854 B2 * | 5/2013 | Nolcheff | F04D 29/444 60/751 |
| 9,797,313 B2 | 10/2017 | Morenko | |
| 9,879,606 B2 | 1/2018 | Morenko et al. | |
| 10,294,865 B2 | 5/2019 | Morenko | |
| 11,655,921 B2 | 5/2023 | Morenko et al. | |
| 11,885,498 B2 * | 1/2024 | Joshi | F23R 3/34 |
| 2023/0194097 A1 | 6/2023 | Hart et al. | |

* cited by examiner

*Primary Examiner* — Kyle Robert Thomas

(74) *Attorney, Agent, or Firm* — Carter, DeLuca & Farrell LLP

(57) ABSTRACT

A turbine engine has a compression section, a combustion section, a turbine section in serial flow arrangement and defining a working airflow path. The combustion section has a circumferential casing, a combustor, and a fuel nozzle. The circumferential casing defines an interior. The turbine engine includes a deswirler assembly. The deswirler assembly couples the working airflow path of the compression section to the interior. The turbine engine includes a fuel supply system.

19 Claims, 5 Drawing Sheets

TURBINE ENGINE HAVING A COMBUSTION SECTION

TECHNICAL FIELD

The present subject matter relates generally to a combustion section for a turbine engine.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called NOx), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
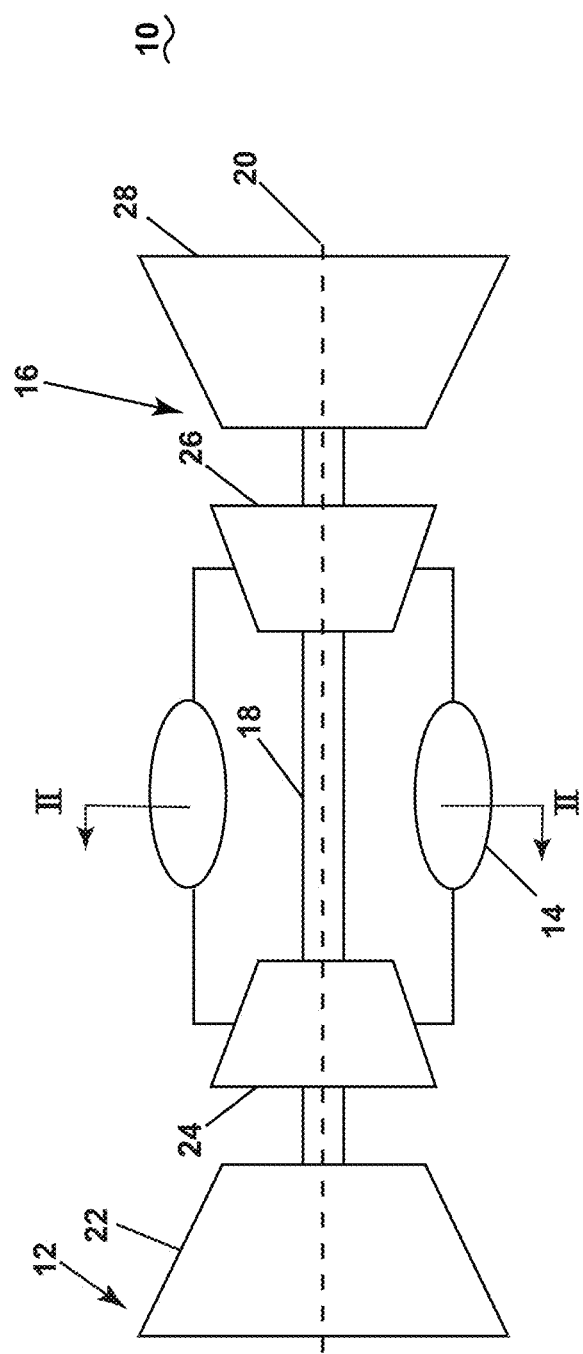
FIG. 1 is a schematic cross-sectional view of a turbine engine having a compressor section, a combustion section, and a turbine section in accordance with various aspects described herein.

Aspects of the disclosure described herein are directed to a turbine engine having a working airflow path, a deswirler assembly, a combustion section, and a fuel supply system. The combustion section includes a circumferential casing, a combustor, and a set of fuel nozzles. The circumferential casing defines an interior. The combustor is located within the interior. The deswirler assembly opens to the interior and fluidly couples the working airflow path to a respective portion of the interior. The deswirler assembly includes a deswirler and a diffuser. The deswirler and the diffuser including a set of deswirler walls and a set of diffuser walls, respectively, defining a set of deswirler channels and a set of diffuser channels therebetween, respectively. The fuel supply system includes a set of fuel channels that extend through at least one wall of the set of diffuser walls or the set of deswirler walls. The fuel supply system includes a set of fuel line branches extending within the interior and being fluidly coupled to at least a portion of the set of fuel nozzles.

The set of fuel channels formed within the deswirler assembly and the set of fuel line branches are formed as a unitary body. A joint is formed between the set of fuel line branches and the set of fuel nozzles. The joint forms a hermetic seal. As used herein, a joint of the fuel supply system is a coupling or formation between the fuel supply system and a corresponding anchoring point of the combustion chamber (e.g., least a portion of the set of fuel nozzles).

The fuel supply system is especially advantageous for use when feeding a flow of hydrogen-containing fuel (hereinafter, "H2 fuel") to the combustion chamber via the fuel supply system. H2 fuel can include a gaseous H2 fuel, a liquid H2 fuel, or a combination thereof. The flow of H2 fuel can further be mixed with other fuels or fluids such as, but not limited to, natural gas, coke oven gas, diesel, Jet-A, or the like. H2 fuels, when compared to traditional fuels (e.g., carbon fuels, petroleum fuels, etc.), have lower carbon emissions. However, H2 fuels burn hotter than and are relatively more unstable when compared to traditional fuels. For example, H2 fuel spreads faster and has a tendency to leak through joints formed within fuel supply systems. Put another way, H2 fuel has a high tendency to leak into undesired locations within combustion sections of conventional fuel supply systems where two or more elements coupled to one another are used. The disclosed fuel supply system, including the set of fuel channels and the set of fuel line branches formed as a unitary body, minimizes the total number of joints within the fuel supply system and between the fuel supply system and other portions of the combustion section. The minimizing of the joints, in turn, minimizes the likelihood of H2 fuel leaking from the fuel supply system and into undesirable portions of the combustion section in relation to utilizing the conventional fuel supply system and H2 fuel.

For purposes of illustration, the present disclosure will be described with respect to a turbine engine. It will be understood, however, that aspects of the disclosure described herein are not so limited and that a combustion section as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first" and "second" may be used interchangeably to distinguish one component from another and are not intended to signify location or importance of the individual components.

The terms "forward" and "aft" refer to relative positions within a gas turbine engine or a vehicle, and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or a combination thereof. The term "fluidly coupled" means that a fluid is capable of making the connection between the areas specified. The term "fluidly exposed" means that one or more portions of an object is contacted by a fluid.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The term "nozzle" has been used in various ways in the context of gas turbine engines. In the instant application, "nozzle" refers to a component having a portion for fluid coupling to a fuel supply and having at least one portion for fluidly coupling with a combustion chamber.

All directional references (e.g., radial, axial, upper, lower, left, right, front, back, top, bottom, above, below, vertical, horizontal, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms "a", "an", and "the" include plural references unless the context clearly dictates otherwise. Furthermore, as used herein, the term "set" or "subset" or a "set" or a "subset" of elements can be any number of elements, including only one.

Uses of "and" and "or" are to be construed broadly. For example and without limitation, uses of "and" do not necessarily require all elements or features listed, and uses of "or" are inclusive unless such a construction would be illogical.

FIG. 1 is a schematic view of a turbine engine 10. As a non-limiting example, the turbine engine 10 can be used within an aircraft. The turbine engine 10 includes, at least, a compression section 12, a combustion section 14, and a turbine section 16 in serial flow arrangement. A drive shaft 18 rotationally couples the compression section 12 and the turbine section 16, such that rotation of one affects the rotation of the other, and defines a rotational axis or engine centerline 20 for the turbine engine 10.

The compression section 12 can include a low-pressure (LP) compressor 22, and a high-pressure (HP) compressor 24 serially fluidly coupled to one another. The turbine section 16 can include an LP turbine 28, and an HP turbine 26 serially fluidly coupled to one another. The drive shaft 18 operatively couples the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft couples the LP compressor 22 to the LP turbine 28, and the HP drive shaft couples the HP compressor 24 to the HP turbine 26. An LP spool is defined as the combination of the LP compressor 22, the LP turbine 28, and the LP drive shaft such that the rotation of the LP turbine 28 applies a driving force to the LP drive shaft, which in turn rotates the LP compressor 22. An HP spool is defined as the combination of the HP compressor 24, the HP turbine 26, and the HP drive shaft such that the rotation of the HP turbine 26 applies a driving force to the HP drive shaft which in turn rotates the HP compressor 24.

The compression section 12 includes a plurality of axially spaced stages. Each stage includes a set of circumferentially spaced rotating blades and a set of circumferentially spaced stationary vanes. The compressor blades for a stage of the compression section 12 can be mounted to a disk, which is mounted to the drive shaft 18. Each set of blades for a given stage can have its own disk. The vanes of the compression section 12 can be mounted to a casing which can extend circumferentially about the turbine engine 10. It will be appreciated that the representation of the compression section 12 is merely schematic and that there can be any number of stages. Further, it is contemplated, that there can be any other number of components within the compression section 12.

Similar to the compression section 12, the turbine section 16 includes a plurality of axially spaced stages, with each stage having a set of circumferentially spaced, rotating blades and a set of circumferentially spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 is provided serially between the compression section 12 and the turbine section 16. The combustion section 14 is fluidly coupled to at least a portion of the compression section 12 and the turbine section 16 such that the combustion section 14 at least partially fluidly couples the compression section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compression section 12 via a fan (not illustrated) upstream of the compression section 12, where the air is compressed defining a compressed air. The compressed air then flows into the combustion section 14 where the compressed air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The compressed air flow and the combustion gases can together define a working air flow that flows through the fan, compression section 12, combustion section 14, and turbine section 16 of the turbine engine 10.

Figure 2:
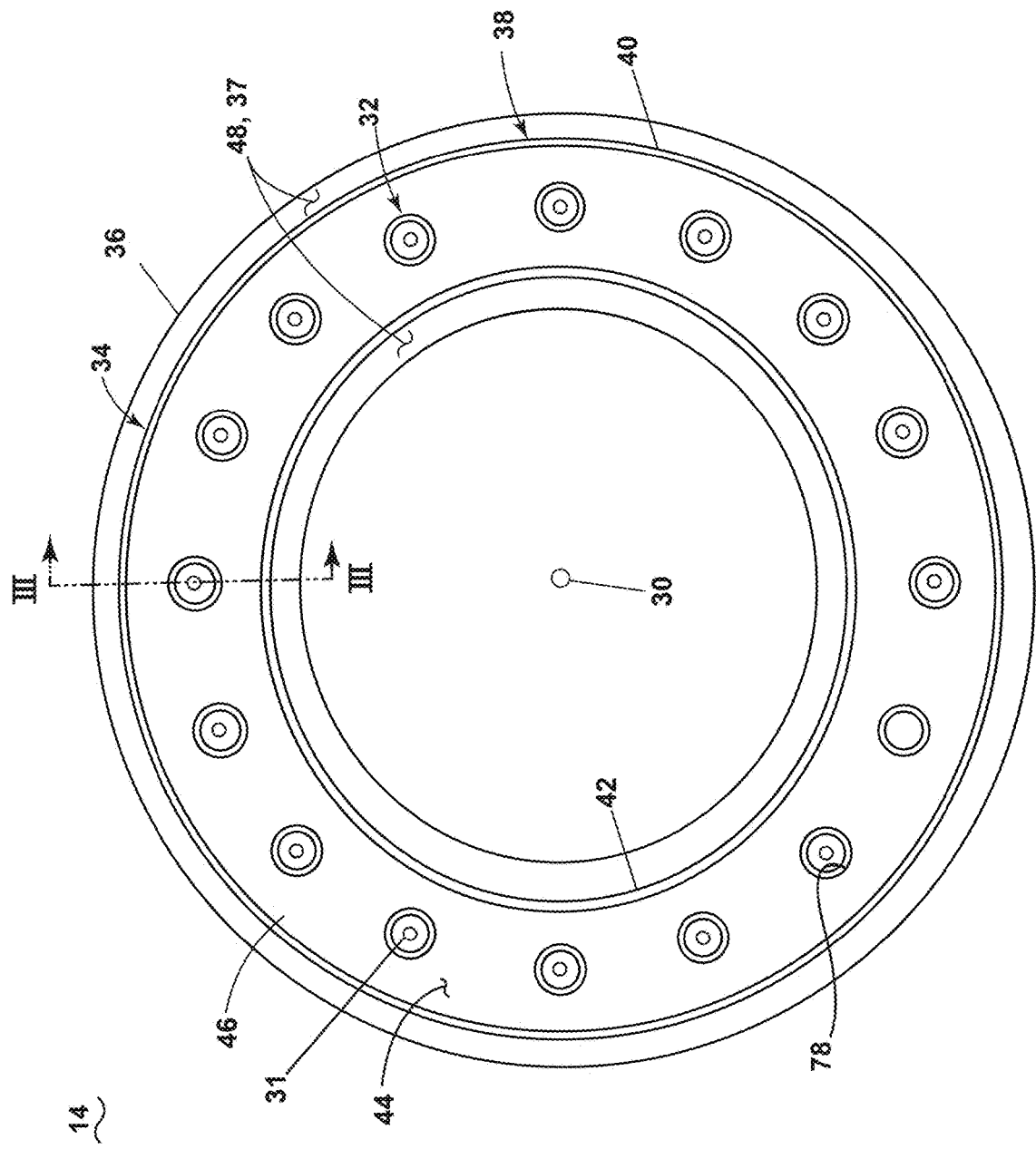
FIG. 2 is a schematic view of a combustor of the combustion section of FIG. 1 along line II-II in accordance with various aspects described herein.

FIG. 2 depicts a cross-sectional view of the combustion section 14 along line II-II of FIG. 1. For purposes of illustration, the drive shaft 18 (FIG. 1) has been removed. The combustion section 14 includes a circumferential casing 36 and a combustor 34. The circumferential casing 36 includes a centerline 30. The centerline 30 can be aligned with or offset from the engine centerline 20 (FIG. 1) of the turbine engine 10 (FIG. 1). The circumferential casing 36 defines an interior 37. The combustor 34 is located within the interior 37. The combustor 34 includes an annular liner 38 and a dome wall 44. The annular liner 38 can include an outer liner 40 and an inner liner 42. The dome wall 44 interconnects the inner liner 42 and the outer liner 40. The dome wall 44 and the annular liner 38 collectively form a combustion chamber 46. The combustor 34 can have a can, can-annular, or annular arrangement depending on the type of engine in which the combustor 34 is located. In a non-limiting example, the combustor 34 can have a combination arrangement as further described herein located within a circumferential casing 36 of the turbine engine 10. The annular liner 38, as illustrated by way of example, can be annular. A compressed air passageway 48 can be defined at least in part by both the annular liner 38 and the circumferential casing 36. The compressed air passageway 48 is located within the interior 37.

The dome wall 44 includes a set of fuel nozzle openings 78. The combustion section 14 includes a set of fuel nozzles 32 extending through the set of fuel nozzle openings 78. The set of fuel nozzles 32 are annularly arranged about the centerline 30. The set of fuel nozzles 32 are fluidly coupled to the combustion chamber 46. Each fuel nozzle of the set of fuel nozzles 32 includes a fuel nozzle centerline 31.

Figure 3:
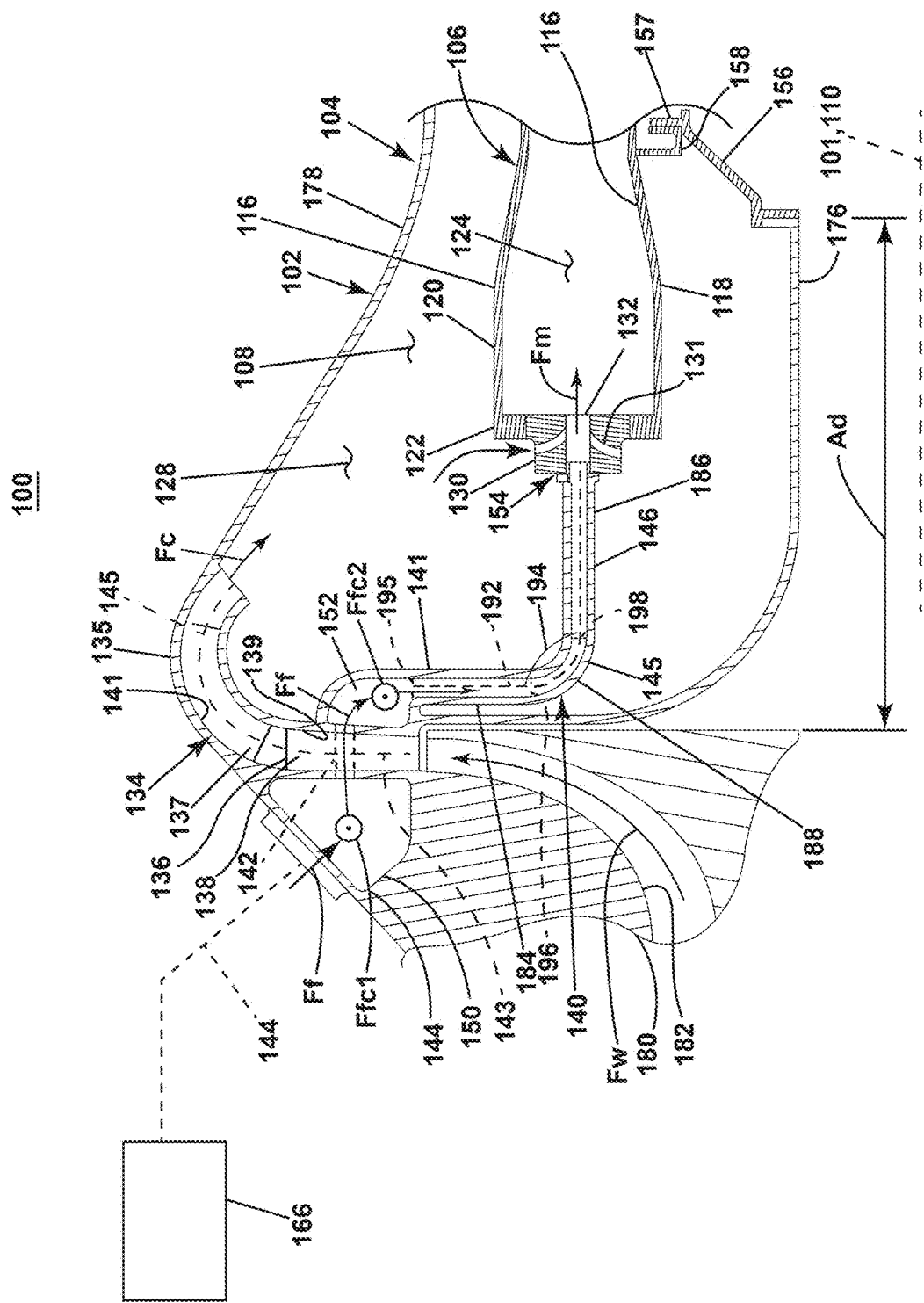
FIG. 3 is a schematic cross-sectional view illustrating portions of an exemplary turbine engine suitable for use as the turbine engine of FIG. 1, further illustrating a combustion section including a combustor and a fuel supply system, the turbine engine including a deswirler assembly fluidly coupled to the combustion section in accordance with various aspects described herein

FIG. 3 is a schematic cross-sectional view illustrating an exemplary turbine engine 100 suitable for use as the turbine engine 10 of FIG. 1. The turbine engine 100 is similar to the turbine engine 10; therefore, like parts will be identified with like names with it being understood that the description of the turbine engine 10 applies to the turbine engine 100 unless noted otherwise.

The turbine engine 100 includes an engine centerline 101 and a combustion section 102. The combustion section 102 includes a circumferential casing 104, a fuel supply system 140 and a combustor 106. The combustion section 102 includes a centerline 110. The centerline 110, as illustrated, is aligned with the engine centerline 101. It will, be appreciated, however, that at least a portion of the centerline 110 can be offset from the engine centerline 101. The circumferential casing 104 defines an interior 108.

The circumferential casing 104 can include an inner circumferential casing 176 and an outer circumferential casing 178. The interior 108 is formed radially therebetween.

The combustor 106 can include an annular liner 116 and a dome wall 122. The annular liner 116 and the dome wall 122 collectively form a combustion chamber 124. The annular liner 116 includes an inner liner 118 and an outer liner 120. The dome wall 122 interconnects the inner liner 118 and the outer liner 120. It will be appreciated that the combustor 106 can have various configurations. As a non-limiting example, the dome wall 122 can be excluded and the inner liner 118 can extend from the outer liner 120

The combustion section 102 includes a set of fuel nozzles 130. Each fuel nozzle of the set of fuel nozzles 130 opens at a fuel nozzle outlet 132 to a respective portion of the combustion chamber 124. Each fuel nozzle of the set of fuel nozzles 130 can include a compressed air inlet 131 adapted to feed a flow of compressed air through a respective portion of the fuel nozzle 130. The compressed air inlet 131 can be, for example, a swirler adapted to impart a swirl on a flow of fluid flowing through the compressed air inlet 131. The amount of swirl to the flow of fluid that flows over or through the compressed air inlet 131 is quantified by a swirl number. The swirl number is defined as an integral of the tangential momentum to the axial momentum of the flow of fluid downstream of a respective compressed air inlet 131. The compressed air inlet 131 can create a swirled air flow having swirl number of greater than 0.2 and less than or equal to 1.5.

While only a single fuel nozzle is shown, the set of fuel nozzles 130 include any number of two or more fuel nozzles. The set of fuel nozzles 130 can extend through various portions of the combustor 106. As a non-limiting example, at least one fuel nozzle of the set of fuel nozzles 130 can extend through a portion of the annular liner 116, the dome wall 122, or a combination thereof.

The combustor 106 is located within the interior 108. At least a portion of the inner liner 118 can be radially inward from the inner circumferential casing 176 with respect to the centerline 110. At least a portion of the outer liner 120 can be radially inward from the outer circumferential casing 178 with respect to the centerline 110. A compressed air passage 128 is formed between the circumferential casing 104 and the combustor 106.

The combustor 106 is coupled to the circumferential casing 104 such that the combustor 106 is suspended within the interior 108. The combustor 106 is coupled to the circumferential casing 104 through any suitable method. As a non-limiting example, the combustion section 102 includes a first flange 158 and a combustor arm 156. The first flange 158 extends from respective portions of the annular liner 116. The combustor arm 156 includes a second flange 157 that is in contact with the first flange 158. The first flange 158, and the combustor arm 156 are at least one of held in frictional contact with each other or otherwise coupled to each other through any suitable coupling method such as, but not limited to, welding, bolting, adhesion, fastening, or the like. The combustor arm 156 extends (e.g., radially outward and forward) from the combustor 106 and to a respective portion of the circumferential casing 104 (e.g., the inner circumferential casing 176, the outer circumferential casing 178, or a combination thereof). The combustor arm 156 can be coupled to at least one of the respective portions of the combustor 106, the respective portion of the circumferential casing 104, or a combination thereof through any suitable method such as, but not limited to, welding, bolting, adhesion, fastening, frictional contact, bonding, or the like. Alternatively, the combustor arm 156 can be integrally formed with at least one of the respective portions of the combustor 106, the respective portion of the circumferential casing 104, or a combination thereof.

The turbine engine 100 includes an engine casing 180. The engine casing 180 defines a working airflow path 182 of a compression section (e.g., the compression section 12 of FIG. 1) and a turbine section (e.g., the turbine section 16 of FIG. 1) of the turbine engine 100.

The turbine engine 100 includes a deswirler assembly 134. The deswirler assembly 134 includes a deswirler 135 and a diffuser 136. The diffuser 136 is provided upstream of the deswirler 135. The deswirler 135 and the diffuser 136 each include a set of walls and a set of channels. The deswirler 135 includes a set of deswirler walls 137 and a set of deswirler channels 141. The set of deswirler walls 137 are circumferentially spaced, with respect to the engine centerline 101. The set of deswirler channels 141 are formed circumferentially between circumferentially opposing portions of the set of deswirler walls 137. The diffuser 136 includes a set of diffuser walls 138 and a set of diffuser channels 139. The set of diffuser walls 138 are circumferentially spaced, with respect to the engine centerline 101. The set of diffuser channels 139 are formed circumferentially between circumferentially opposing portions of the set of diffuser walls 138. The set of diffuser channels 139 open to the set of deswirler channels 141. The deswirler assembly 134 includes a deswirler assembly centerline 143 extending through the set of diffuser channels 139 and the set of deswirler channels 141.

The diffuser 136 can be coupled to the deswirler 135. As a non-limiting example, the diffuser 136 and the deswirler 135 can be defined by separate bodies that are coupled to one another via any suitable coupling method such as, but not limited to, adhesion, welding, fastening, threating, bolting, or the like. Alternatively, the diffuser 136 and the deswirler 135 can be integrally formed such that the deswirler assembly 134 is formed as a single, unitary body.

The fuel supply system 140 is fluidly coupled to a fuel source 166 via a fuel supply 144 (illustrated in phantom lines). The fuel supply 144 can include a singular conduit extending from the fuel source 166 or multiple conduits extending from the fuel source 166. The fuel source 166 is any suitable container or vessel configured to hold a volume of fuel in a liquid, solid, or gaseous form. The fuel source 166 can be located within various portions of the turbine engine 100 or exterior the turbine engine 100. As a non-limiting example, the turbine engine 100 can be coupled to a wing of an aircraft, and the fuel source 166 can be located within the wing.

The fuel supply system 140 includes a body 145. The body 145 is defined as a continuous series of walls, conduits, or tubes that defines fluid passages within the fuel supply system 140. The fuel supply system 140 includes a set of fuel channels 142, and a set of fuel line branches 146. The body 145 defines the set of fuel channels 142 and the set of fuel line branches 146. The fuel supply system 140 can further include one or more distribution manifolds or plenums, such as an exterior plenum 150 located exterior to the interior 108, and an interior plenum 152 located within the interior 108. The body 145 can define at least one of the interior plenum 152 or the exterior plenum 150.

The set of fuel channels 142 are located within a respective portion of the deswirler assembly 134. The set of fuel channels 142 can include any number of one more fuel channels. As a non-limiting example, the set of fuel channels 142 can include a plurality of fuel channels. The exterior plenum 150, if included, can be used to distribute a fluid received from the fuel supply 144 to one or more fuel channels of the set of fuel channels 142. As illustrated, the set of fuel channels 142 are formed as straight channels extending through a respective portion of the deswirler assembly 134. As a non-limiting example, the set of fuel channels 142 extend through a respective wall of the set of walls of the deswirler assembly 134. As a non-limiting example, the set of fuel channels 142 extend through a respective portion of the set of diffuser walls 138.

However, it will be appreciated that the set of fuel channels 142 can extend through a portion of at least one of the set of diffuser walls 138, the set of deswirler walls 137, or a combination thereof. It will be appreciated, however, that the set of fuel channels 142 can have various formations. As a non-limiting example, the set of fuel channels 142 can include a curved or S-shaped passage.

The exterior plenum 150 can extend circumferentially about the engine centerline 101. The interior plenum 152 can extend circumferentially about the centerline 110. The exterior plenum 150 and the interior plenum 152 can, as a non-limiting example, extend about greater than or equal to 25% and less than or equal to 100% of a circumferential extent of the centerline 110. The exterior plenum 150 and the interior plenum 152 can be formed as a duct or tube that extends about an entirety of a circumferential extent of the engine centerline 101 or the centerline 110, respectively. Alternatively, the exterior plenum 150 and the interior plenum 152 can each be formed as a duct or tube that extends about less than the entirety of the circumferential extent of the engine centerline 101 or the centerline 110, respectively. The exterior plenum 150 and the interior plenum 152 can be formed as a continuous duct or tube. Alternatively, the exterior plenum 150 and the interior plenum 152 can be made up of multiple segmented bodies that are circumferentially spaced from one another, with respect to the engine centerline 101 or the centerline 110, respectively.

Each fuel line branch of the set of fuel line branches 146 extends to a respective one fuel nozzle of the set of fuel nozzles 130 from one of either the set of fuel channels 142 or the interior plenum 152, if included. There are any number of two or more fuel line branches of the set of fuel line branches 146. As a non-limiting example, each fuel nozzle of the set of fuel nozzles 130 can be fluidly coupled to a respective one fuel line branch of the set of fuel line branches 146. As such, a total number of fuel line branches of the set of fuel line branches 146 can be equal to a total number of fuel nozzles of the set of fuel nozzles 130. The interior plenum 152, if included, can be used to distribute a flow of fluid within the interior plenum 152 from the set of fuel channels 142 to one or more fuel line branches of the set of fuel line branches 146.

Each fuel line branch of the set of fuel line branches 146 includes a first leg 184, a second leg 186, and a bend 188. The first leg 184 extends between the interior plenum 152 and the bend 188. The bend 188 interconnects the first leg 184 and the second leg 186. The bend 188 is generally defined as any transition between the first leg 184 and the second leg 186.

For purposes of illustration, a first transition 195 is shown in phantom lines between the first leg 184 and the interior plenum 152, a second transition 196 is shown in phantom lines between the first leg 184 and the bend 188, and a third transition 198 is shown in phantom lines between the bend 188 and the second leg 186. Each leg of the multiple fuel line branches includes a branch centerline 192. A leg angle 194 is formed between the branch centerline 192 at the second transition 196 and the branch centerline 192 at the third transition 198. The leg angle 194 is greater than or equal to 30 degrees and less than or equal to 150 degrees. The first leg 184 and the second leg 189, however, can extend in any suitable direction. In some instances, it is contemplated that at least a portion of the branch centerline 192 within the first leg 184 and at least a portion of the branch centerline 192 within the second leg 186 lay along two or more planes that extend along the centerline 110 and intersect the branch centerline 192 at a respective portion.

While described in terms of the set of fuel line branches 146 extending between the interior plenum 152 and the set of fuel nozzles 130, it will be appreciated that at least one fuel line branch of the set of fuel line branches 146 can extend between a respective fuel channel of the set of fuel channels 142 and a respective portion of the set of fuel nozzles 130. As a non-limiting example, the interior plenum 152 can be omitted from the fuel supply system 140.

The fuel supply system 140 extends into the combustion section 102. Put another way, a first portion of the fuel supply system 140 is located within the combustion section 102, while a second portion is located exterior the combustion section 102. The interior plenum 152 and the set of fuel line branches 146 are located within the combustion section 102. The set of fuel channels 142 and optionally the exterior plenum 150 can be made integral with the combustion section 102 (described in further detail below), and therefore be formed as a portion of the combustion section 102.

At least a portion of the fuel supply system 140 is formed as a single, unitary body. Specifically, the body 145 (combination of the set of fuel channels 142, and the set of fuel line branches 146, along with the interior plenum 152 and the exterior plenum 150 when they are included) is formed as the unitary body. For example, the set of fuel channels 142, the interior plenum 152 (when included), the exterior plenum 150 (when included), and the set of fuel line branches 146 are formed as a unitary body, hereinafter referred to as "the unitary body of the fuel supply system 140". The fuel supply system 140 can be manufactured through any suitable method such as, but not limited to, 3D printing, casting, or the like. While not illustrated, it will be appreciated that the body 145 can include two or more components coupled to one another in a fluid-tight manner. As a non-limiting example, the set of fuel channels 142 can be formed as a separate body from the set of fuel line branches 146. The set of fuel channels 142 and the set of fuel line branches 146 can then be coupled together through, for example, welding, brazing, or a combination thereof to form the body 145. When formed by two or more bodies that are coupled to one another, additively manufactured, casted, or the like, of the set of fuel channels 142, and the set of fuel line branches 146, along with the interior plenum 152 and the exterior plenum 150 when they are included are said to be formed as a unitary body in which a fluid within the body 145 cannot egress from the body 145 along the transitions between the various components of the body 145.

A set of joints 154 are formed between each fuel line branch of the set of fuel line branches 146 and the respective one fuel nozzle of the set of fuel nozzles 130. The set of joints 154 define physical couplings between the unitary body of the fuel supply system 140 and the combustion section 102. The physical couplings can be made through any suitable coupling method such as, but not limited to, welding, bolting, adhesion, bonding, fastening, or the like. While described in terms of being connected directly to the respective fuel nozzle of the set of fuel nozzles 130, it will be appreciated that the respective fuel nozzle can be omitted and at least one fuel line branch of the multiple fuel line branches 146 can be coupled to and extend through a respective portion of the inner liner 118, the outer liner 120, the dome wall 122, or a combination thereof It will be appreciated that the set of joints 154 are provided at locations where an interior conduit or passageway of the body 145 of the fuel supply system 140 is fluidly coupled to a fluid conduit or fluid passageway located exterior the fuel supply system 140. For example, the set of joints 154 are formed at a location where the set of fuel line branches 146 open to a respective portion of the combustion chamber 124 (e.g., through at least a portion of the set of fuel nozzles 130, the dome wall 122, the inner liner 118, or the outer liner 120).

The deswirler assembly 134 defines a fluid coupling between the working airflow path 182 and the compressed air passage 128 of the combustion section 102. Put another way, the working airflow path 182 of an upstream portion of the turbine engine 100 (e.g., the compression section) opens to the set of diffuser channels 139, which open to the set of deswirler channels 141. The set of deswirler channels 141 open to the compressed air passage 128 of the combustion section 102.

At least a portion of the deswirler assembly 134 is formed by the engine casing 180. As a non-limiting example, an entirety of the deswirler assembly 134 is integrally formed as a unitary body with the circumferential casing 104. It is further contemplated that the at least a portion of the fuel supply system 140 can be integrally formed with the circumferential casing 104 and the deswirler assembly 134. For example, the unitary body of the fuel supply system 140, the circumferential casing 104 and the deswirler assembly 134 can be formed as a unitary body.

During operation, a working airflow (Fw) is drawn from the compression section (e.g., the compression section 12 of FIG. 1) and is fed through the working airflow path 182 into the set of diffuser channels 139. The set of diffuser channels 139 are formed to reduce a velocity of the working airflow (Fw). The formation of the set of diffuser channels 139 will be described in further detail in relation to FIG. 4. The working airflow (Fw) within the diffuser 136 is then fed to the set of deswirler channels 141. The set of deswirler walls 137 are oriented such that the working airflow (Fw) fed through the set of deswirler channels 141 enters the compressed air passage 128 as a deswirled airflow (Fc) having zero tangential momentum. The orientation of the set of deswirler walls 137 enabling the deswirling of the working airflow (Fw) will be described in further detail in relation to FIG. 4.

With further reference to FIG. 3, at least a portion of the deswirled airflow (Fc) is fed to a downstream portion of the turbine engine 100 (e.g., the turbine section) via the compressed air passage 128. At least a portion of the deswirled airflow (Fc) is fed to the combustion chamber 124 through at least one of the compressed air inlet 131 of the set of fuel nozzles 130, a series of holes or passages (not illustrated) formed within a portion of the combustor 106 (e.g., at least one of the annular liner 116 or the dome wall 122), or a combination thereof.

A flow of fuel (Ff) is drawn from the fuel source 166 and fed to the fuel supply 144. The flow of fuel (Ff) within the fuel supply 144 is fed to the set of fuel channels 142. The flow of fuel (Ff) flows through the exterior plenum 150, when included, as a first circumferential flow of fuel (Ffc1) that is fed to two or more circumferentially spaced fuel channels of the set of fuel channels 142. The flow of fuel (Ff) from the set of fuel channels 142 is fed to the set of fuel line branches 146. The flow of fuel (Ff) flows through the interior plenum 152, when included, as a second circumferential flow of fuel (Ffc2) that is fed to two or more circumferentially spaced fuel line branches of the set of fuel line branches 146. The flow of fuel (Ff) within the set of fuel line branches 146 is fed to at least a portion of the set of fuel nozzles 130. The flow of fuel (Ff) is then fed to the combustion chamber 124 where the flow of fuel (Ff) is ignited to generate a flame within the combustion chamber 124. It will be appreciated that the flow of fuel (Ff) can be mixed with a respective portion of the deswirled airflow (Fc) prior to being ignited.

The set of joints 154 are formed as hermetic seals. Put another way, the set of joints 154 are formed to restrict or otherwise prevent the flow of fuel (Ff) from flowing out of the set of joints 154 and into the compressed air passage 128.

Some fuels tend to flow through joints formed within a respective fuel supply system. Specifically, H2 fuels have a higher tendency to leak through or otherwise flow through joints within a respective fuel supply system. Put another way, even if the joints are formed as hermetic seals, at least a portion of the H2 fuel may still flow through the joints and into the compressed air passage 128. It is desirable to limit a total number of physical joints or couplings between fuel supply system 140 and the combustion section 102 and within the fuel supply system 140 itself. It will be appreciated the unitary body of the fuel supply system 140 limits a total number of joints to the set of joints 154 within the combustion section 102, which limits the locations where H2 fuel can leak from the fuel supply system 140 and into the compressed air passage 128. Put another way the unitary body of the fuel supply system 140 enables the fuel supply system 140 to be especially well adapted for use when H2 fuel is used within the flow of fuel (Ff).

Limiting the amount of leakage of the flow of fuel (Ff) from the fuel supply system 140 and into the compressed air passage 128 can be done by limiting a total number of joints between the body 145 and the combustion section 102. Limiting the amount of leakage of the flow of fuel (Ff) increases the ratio between fuel fed to the combustion chamber 124 and fuel leaked into the compressed air passage 128. Increasing the ratio between fuel fed to the combustion chamber 124 and fuel leaked into the compressed air passage 128 reduces fuel wastage as the higher the ratio, the higher the percentage of fuel that is combusted to generate combustion gases that are fed to downstream portions of the turbine engine 100. Therefore, the higher the ratio between fuel fed to the combustion chamber 124 and fuel leaked into the compressed air passage 128, the higher the overall efficiency of the turbine engine 100.

It is contemplated that the working airflow (Fw) that is fed to the compressed air passage 128 as the deswirled airflow (Fc) can be at a temperature of around 1000° F. The relatively high heat of the deswirled airflow (Fc) causes portions of the fuel supply system 140 that come into contact with the deswirled airflow (Fc) (e.g., the set of fuel line branches 146) to experience thermal expansion. The set of fuel line branches 146 are formed to ensure that the hermetic seal is maintained at the set of joints 154.

Further, each fuel line branch of the multiple fuel line branches 146 is designed such that an attenuation distance of the fuel line branch is greater than an axial distance (Ad) that the inner circumferential casing 176 extends. Each fuel line branch of the multiple fuel line branches 146 extends axially along the respective branch centerline 192 for a total distance defined as the attenuation distance. The formation of the axial distance (Ad) as being less than the attenuation distance preloads the multiple fuel line branches 146 against a respective portion of the combustion section 102. This, in turn, helps keep the multiple fuel line branches 146 in contact with (and hermetically sealed with) the respective portion of the combustion section 102.

The flow of fuel (Ff) within the set of fuel channels 142 has a lower temperature than the working airflow (Fw) within the deswirler assembly 134. At least one of the set of deswirler walls 137, the set of diffuser walls 138, or a combination thereof can be made of a thermally conductive material. As such, heat from the working airflow (Fw) within the deswirler assembly 134 can be transferred through at least one of the set of deswirler walls 137, the set of diffuser walls 138, or a combination thereof and to the flow of fuel (Ff) within the set of fuel channels 142. Put another way, at least one of the set of deswirler walls 137, the set of diffuser walls 138, or a combination thereof can act as a heat exchanger that transfers heat from the working airflow (Fw) within the deswirler assembly 134 to the flow of fuel (Ff) prior to the flow of fuel (Ff) being fed to the set of fuel line branches 146, the interior plenum 152, or both. It is contemplated that the working airflow (Fw) within the deswirler assembly 134 can heat the flow of fuel (Ff) within the set of fuel channels 142 to such an amount to cause a phase change of the flow of fuel (Ff). As a non-limiting example, a flow of liquid fuel can be fed through the fuel supply 144 as the flow of fuel (Ff), flow through the set of fuel channels 142, and be heated to such an extent to cause the liquid fuel to change phases to a gaseous fuel. The gaseous fuel can then be fed to the set of fuel line branches 146 as the flow of fuel (Ff). Ensuring that a phase change occurs allows for the fuel source 166 to provide a liquid fuel and for the flow of fuel (Ff) within the combustion chamber 124 to be a gaseous fuel. It is contemplated that a liquid fuel has a higher density than a gaseous fuel. Therefore, a greater mass of liquid fuel can be stored within the fuel source 166 than a volume of gaseous fuel. However, gaseous fuel is more easily shaped and spread to create a desired flame profile within the combustion chamber 124 when compared to liquid fuel.

The formation of the set of fuel channels 142 can be based on an amount of desired heat transfer between the working airflow (Fw) within the deswirler assembly 134 and the flow of fuel (Ff) within the set of fuel channels 142. For example, the set of fuel channels 142 can take a snaking route (e.g., have an S-shaped pattern) within the deswirler assembly 134 such that the total time that the flow of fuel (Ff) within the set of fuel channels 142 is in thermal contact with the working airflow (Fw) within the deswirler assembly 134 is increased; thus increasing the overall heating of the flow of fuel (Ff) within the set of fuel channels 142.

The body 145 can be removed from a remainder of the turbine engine 100 with relative ease. As a non-limiting example, during continued use of the turbine engine 100, the thermal deformation of the fuel supply system 140 within the compressed air passage 128 can cause thermal stresses or otherwise thermal fatigue to be experienced along portions of the fuel supply system 140. It is contemplated that the regions that will experience the largest thermal stresses are those that come into thermal contact with the working airflow (Fw) (e.g., the set of fuel channels 142) and the deswirled airflow (Fc) (e.g., the interior plenum 152 and the set of fuel line branches 146). As such, being able to remove at least the body 145 from the turbine engine 100 allows for replacement of at least the body 145 rather than replacement of larger sections of the turbine engine 100 (e.g., the combustion section 102).

It is contemplated that the use of the body 145 that can be relatively easily removed from the combustion section 102 is especially advantageous for use with H2 fuels. H2 fuels have been found to detrimentally affect materials it comes into contact with, in comparison to conventional fuels. Specifically, H2 fuels cause hydrogen embrittlement which causes materials that the H2 fuels come into contact with to degrade at a faster rate than if conventional fuels were used instead. As such, the fuel supply system 140 can degrade faster due to hydrogen embrittlement than portions of the combustion section 102 when H2 fuels are used. The faster degradation of the fuel supply system 140, in turn, means that the fuel supply system 140 can have a shorter lifespan than other portions of the combustion section 102. Forming the fuel supply system 140 with the body 145 allows for relatively easy removal of the body 145 from the combustion section 102 so the body 145 can be replaced.

Figure 4:
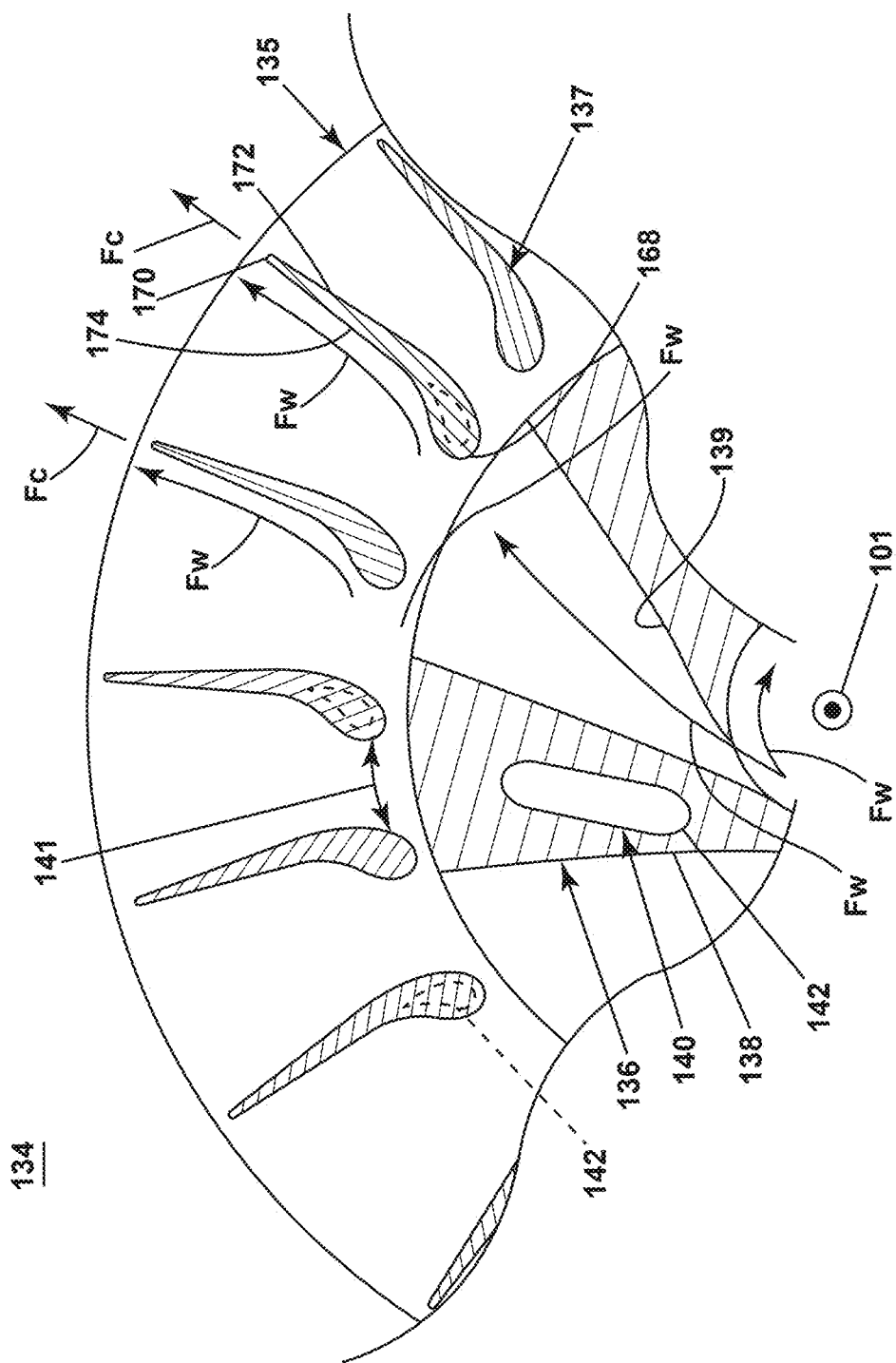
FIG. 4 is a schematic cross-sectional view of the deswirler assembly of FIG. 3, further illustrating a deswirler and a diffuser in accordance with various aspects described herein.

FIG. 4 is a schematic cross-sectional view of the deswirler assembly 134 of FIG. 3 as viewed along the deswirler assembly centerline 143. The set of diffuser channels 139 expand circumferentially as they progress radially outward from the engine centerline 101. Put another way, the set of diffuser channels 139 taper outwardly the radially farther the set of diffuser channels 139 are from the engine centerline 101. The set of diffuser walls 138 take any suitable formation. As a non-limiting example, the set of diffuser walls 138 can be formed as a set of airfoils having a leading edge 168, a trailing edge 170, a pressure side 172, and a suction side 174. Alternatively, the set of diffuser walls 138 can be formed as a continuous ring or annulus having a series of channels more similar to the set of diffuser walls 138.

The set of fuel channels 142 are formed within an interior of at least one of the set of diffuser walls 138, the set of deswirler walls 137, or a combination thereof. The set of fuel channels 142 are formed within at least a subset of at least one of the set of diffuser walls 138, the set of deswirler walls 137, or a combination thereof. As a non-limiting example, the set of fuel channels 142 are formed within half of at least one of the set of diffuser walls 138, the set of deswirler walls 137, or a combination thereof. Alternatively, the set of fuel channels 142 can be formed within any number of one or more walls of at least one of the set of diffuser walls 138, the set of deswirler walls 137, or a combination thereof. The set of fuel channels 142 are arranged in various patterns. As illustrated in phantom lines, the set of fuel channels 142 are located in every other wall of the set of deswirler walls 137. As such, the set of fuel channels 142 can be evenly circumferentially spaced. It will be appreciated, however, that the set of fuel channels 142 can have various patterns in relation to the set of diffuser walls 138 and the set of deswirler walls 137. For example, the set of fuel channels 142 can be disposed in an every other deswirler wall 137 or diffuser wall 138, every third deswirler wall 137 or diffuser wall 138, or the like.

During operation, the working airflow (Fw) is fed to the diffuser 136. As illustrated, the working airflow (Fw), prior to entering the diffuser 136, has a circumferential component. The working airflow (Fw) flows within the set of diffuser channels 139. As the working airflow (Fw) flows through the set of diffuser channels 139, the working airflow (Fw) velocity is reduced and static pressure is increased due to expanding nature of diffuser channels 139 (volume increase). The working airflow (Fw) from the set of diffuser channels 139 is then fed to the deswirler 135. The working airflow (Fw) flows within the set of deswirler channels 141 following a curvature defined by the pressure side 172. The set of deswirler walls 137 are oriented such that the working airflow (Fw) within the set of deswirler channels 141 is deswirled to form the deswirled airflow (Fc).

Figure 5:
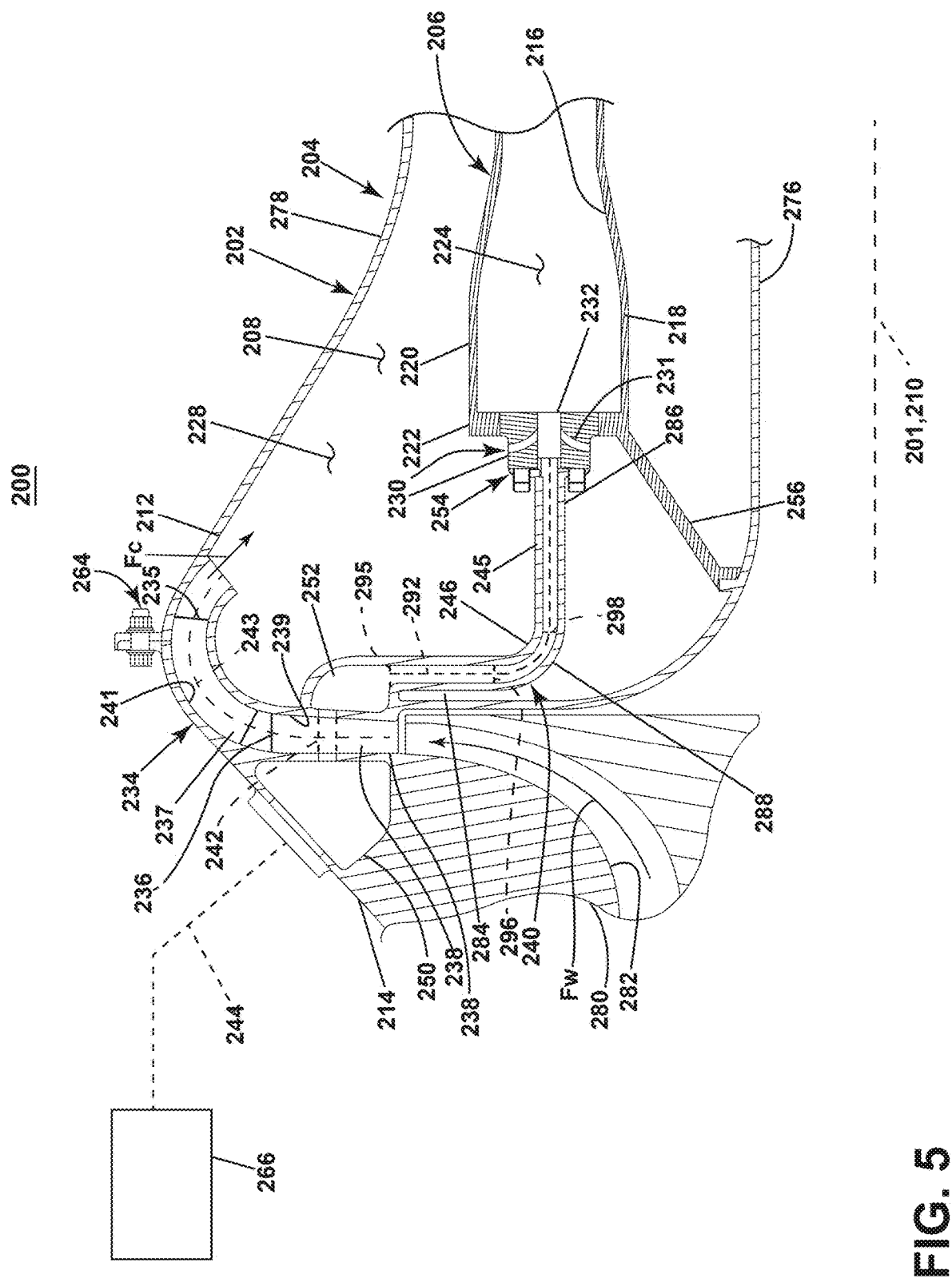
FIG. 5 is a schematic cross-sectional view illustrating an exemplary turbine engine suitable for use as the turbine engine of FIG. 1, further illustrating a combustion section including a combustor and a circumferential casing, the combustor being secured to the circumferential casing through a combustor arm in accordance with various aspects described herein

FIG. 5 is a schematic cross-sectional view of an exemplary turbine engine 200 suitable for use as the turbine engine 10 of FIG. 1. The turbine engine 200 is similar to the turbine engine 10 (FIG. 1), 100 (FIG. 3); therefore, like parts will be identified with like names in relation to the turbine engine 10 (FIG. 1) and like numerals increased to the 200 series in relation to the turbine engine 100 (FIG. 3), with it being understood that the description of the turbine engine 10 (FIG. 1), 100 (FIG. 3) applies to the turbine engine 200 unless noted otherwise.

The turbine engine 200 includes an engine centerline 201, an engine casing 280, a deswirler assembly 234, and a combustion section 202. The engine casing 280 at least partially defines a working airflow path 282. The deswirler assembly 234 includes a deswirler 235 and a diffuser 236. The diffuser 236 has a set of diffuser walls 238 and a set of diffuser channels 239. The deswirler 235 has a set of deswirler walls 237 and a set of deswirler channels 241. The deswirler assembly 234 includes a deswirler assembly centerline 243. The combustion section 202 includes a circumferential casing 204 and a combustor 206. The combustion section 202 includes a centerline 210. The circumferential casing 204 defines an interior 208. The circumferential casing 204 includes an inner circumferential casing 276 and an outer circumferential casing 278. The combustor 206 has an annular liner 216 and a set of fuel nozzles 230. The set of fuel nozzles 230 each open to a combustion chamber 224 at a fuel nozzle outlet 232. The annular liner 216 includes an inner liner 218 and an outer liner 220. The combustor 206 can include a dome wall 222. The dome wall 222 and the annular liner 216 can collectively form the combustion chamber 224. The combustor 206 is located within the interior 208. A compressed air passage 228 is formed between the combustor 206 and the circumferential casing 204.

The turbine engine 200 includes a fuel supply system 240. The fuel supply system 240 has a body 245. The fuel supply system 240 includes a set of fuel channels 242, and a set of fuel line branches 246. The fuel supply system 240 can further include an exterior plenum 250 and an interior plenum 252. The set of fuel line branches 246 are coupled to or otherwise meet at least a portion of the set of fuel nozzles 230 at a set of joints 254. Each fuel line branch of the set of fuel line branches 246 includes a first leg 284, a second leg 286, a branch centerline 292 and a bend 288. The first leg 284 extends between a first transition 295 and a second transition 296. The second leg 286 extends between a third transition 298 and a respective one fuel nozzle of the set of fuel nozzles 230. The fuel supply system 240 is fluidly coupled to a fuel source 266 via a fuel supply 244.

The fuel supply system 240, like the fuel supply system 140 (FIG. 3), is partially formed as a unitary body. A difference, however, is that the set of fuel line branches 246, the set of fuel channels 242, and the interior plenum 252 (when included) are formed as the unitary body (hereinafter referred to as "the unitary body of the fuel supply system 240"), and the exterior plenum 250 (if any) is excluded from the unitary body of the fuel supply system 240.

The turbine engine 200 is similar to the turbine engine 100 in that the deswirler assembly 234 is at least partially formed as a unitary body with the circumferential casing 204 and the unitary body of the fuel supply system 240. The deswirler assembly 234, however, is formed by a first body 212 that is coupled to a second body 214. The first body 212 is formed as a unitary body with the circumferential casing 204 and the unitary body of the fuel supply system 240. The set of deswirler walls 237 and the set of diffuser walls 238, and therefore the set of fuel channels 242, are formed as a unitary body with the first body 212. Alternatively, the set of fuel channels 242, the set of deswirler walls 237 and the set of diffuser walls 238 can be formed with the second body 214. Alternatively, a first subset of the set of fuel channels 242 and a first subset of at least one of the set of deswirler walls 237, the set of diffuser walls 238, or a combination thereof can be formed with the first body 212 while a second subset of the set of fuel channels 242 and a second subset of at least one of the set of deswirler walls 237, the set of diffuser walls 238, or a combination thereof can be formed with the second body 214. The exterior plenum 250 (when included) is formed in the second body 214.

The first body 212 is coupled to the second body 214 at a coupling 264. The coupling defines a region where the first body 212 meets and is coupled to the second body 214. The coupling 264 can be made through any suitable coupling method such as, but not limited to, fastening, bolting, adhesion, welding, bonding, or the like. The coupling 264 is reversible such that the first body 212 is removably coupled to the second body 214. As such, the unitary body of the fuel supply system 240 is removably couplable to the second body 214. The removable coupling of the unitary body of the fuel supply system 240 to the second body 214 allows for a lesser amount of the fuel supply system 240 to be replaced during maintenance in comparison with the fuel supply system 140 of FIG. 3. Further, the ability to remove the fuel supply system 240 from the second body 214 allows for access to the set of joints 254 formed along the fuel supply system 240. It is contemplated that the set of joints 254 can be, for example, a set of screws, bolts (as illustrated), or fasteners that need to be manually disengaged. Removing the fuel supply system 240 from the second body 214 allows for access to the set of joints 254 to allow for a decreased burden of disengaging the set of joints 254.

The combustor 206, like the combustor 106 (FIG. 3), is coupled to the inner circumferential liner 276 via a combustor arm 256. The combustor arm 256, however, extends from an axially forward portion of the annular liner 216 and/or dome wall 222. The combustor arm 256 can be integrally formed with the combustor 206.

During operation, it is contemplated that the combustor 206 can expand or contract due to thermal expansion as a result of the flame within the combustion chamber 224, the deswirled airflow (e.g., the deswirled airflow (Fc) of FIG. 3), or a combination thereof. The combustor arm 256 is oriented to stabilize the combustor 206 during the thermal expansion of the combustor 206 while still allowing the combustor 206 to move with the thermal expansion. The movement of the combustor 206 with the thermal expansion reduces the possibility or magnitude of stresses being formed along stabilizing portions of the combustor 206 (e.g., the combustor arm 256).

The combustion section as described herein, includes the unitary body of the fuel supply system that can be removed from the fuel supply and the fuel source. It is contemplated that at least a majority of the unitary body of the fuel supply system are the portions of the fuel supply system where thermal expansion and thermal fatigue is expected. Put another way, the unitary body of the fuel supply system are the portions of the fuel supply system expected to need replacement first. Utilizing the unitary body of the fuel supply system allows for only these portions to be replaced when needed, instead of the entire fuel supply system.

With some aspects, the disclosed combustion section and fuel nozzles can be utilized with gaseous fuel, such as hydrogen. Gaseous fuel, including hydrogen, spreads/disperses at a faster rate than atomized liquid fuel. The fuel supply system as described herein is especially adapted for use with H2 fuel. H2 fuel, when utilized, has lower NOx emissions than use of conventional fuels; thereby, allowing for a turbine engine with decreased NOx emissions. Further, in comparison with conventional fuels, H2 fuels have zero $CO_2$ emissions.

To the extent not already described, the different features and structures of the various embodiments can be used in combination, or in substitution with each other as desired. That one feature is not illustrated in all the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a compression section, a combustion section, and a turbine section in serial flow arrangement and defining a working airflow path, the combustion section having a centerline and comprising a circumferential casing defining an interior, a combustor having an annular liner located within the interior, the combustor having a combustion chamber, and a fuel nozzle opening to the combustion chamber, a deswirler assembly fluidly coupling the working airflow path of the compression section to the interior, the deswirler assembly comprising a set of walls and a set of channels formed between adjacent walls of the set of walls, with at least one wall of the set of walls having a fuel channel, and a fuel supply system located within the combustion section, the fuel supply system comprising the fuel channel and a set of fuel line branches, the set of fuel line branches fluidly coupled to and extending within the interior between the fuel channel and the fuel nozzle.

The turbine engine of any preceding clause, wherein the deswirler assembly comprises a deswirler and a diffuser.

The turbine engine of any preceding clause, wherein the diffuser comprises a set of diffuser walls and a set of diffuser channels, with at least a portion of the set of walls being provided within the set of diffuser walls.

The turbine engine of any preceding clause, wherein the deswirler comprises a set of deswirler walls and a set of deswirler channels, with at least a portion of the set of walls being provided within the set of deswirler walls.

The turbine engine of any preceding clause, wherein the fuel channel extends through the interior of the at least one wall.

The turbine engine of any preceding clause, wherein the fuel supply system comprises an exterior plenum extending circumferentially about the centerline and opening to the fuel channel, the exterior plenum being located exterior of the interior.

The turbine engine of any preceding clause, wherein the exterior plenum opens to two or more channels of the set of walls.

The turbine engine of any preceding clause, wherein the exterior plenum extends continuously about greater than or equal to 25% and less than or equal to 100% of a circumferential extent of the centerline.

The turbine engine of any preceding clause, wherein the fuel supply system comprises an interior plenum extending circumferentially about the centerline, the fuel channel opening to the interior plenum.

The turbine engine of any preceding clause, wherein the fuel nozzle is included in a plurality of fuel nozzles, and the fuel supply system comprises set of fuel line branches extending from the interior plenum, with each fuel line branch of the set of fuel line branches extending between a respective portion of the interior plenum and to a corresponding fuel nozzle of the plurality of fuel nozzles.

The turbine engine of any preceding clause, wherein the interior plenum extends continuously about greater than or equal to 25% and less than or equal to 100% of a circumferential extent of the centerline.

The turbine engine of any preceding clause, wherein the fuel nozzle is included in a plurality of fuel nozzles.

The turbine engine of any preceding clause, wherein the fuel channel is included in a plurality of fuel channels, and every other wall of the set of arcuate walls includes at least one fuel channel of the plurality of fuel channels.

The turbine engine of any preceding clause, wherein the set of fuel line branches are coupled to the fuel nozzle at a set of joints being the only couplings between the fuel supply and the combustion section within the interior.

The turbine engine of any preceding clause, wherein the deswirler assembly and the fuel supply are at least partially integrally formed.

The turbine engine of any preceding clause, wherein the at least one wall is a heat exchanger configured to transfer a heat from a working airflow flowing over the at least one wall to a flow of fuel within fuel channel.

The turbine engine of any preceding clause, wherein the combustion section comprises a combustor arm extending between the combustor and the circumferential casing.

The turbine engine of any preceding clause, wherein the circumferential casing, the fuel supply system, and the deswirler assembly are integrally formed.

The turbine engine of any preceding clause, wherein the combustion section comprises a compressed air passage formed between the circumferential casing and the combustor, with the deswirler assembly opening to the compressed air passage.

The turbine engine of any preceding clause, wherein the fuel supply system is configured to supply a flow of gaseous hydrogen-containing fuel to the combustion chamber.

The turbine engine of any preceding clause, wherein the fuel line branch extends from the fuel channel and to the fuel nozzle.

The turbine engine of any preceding clause, wherein the fuel line branch has an attenuation distance, the circumferential casing has an inner circumferential casing that extends an axial distance, with the attenuation distance being greater than the axial distance.

The turbine engine of any preceding clause, wherein the circumferential casing includes a first body and a second body.

The turbine engine of any preceding clause, wherein the first body is coupled to the second body The turbine engine of any preceding clause, wherein the deswirler is integrally formed with one of the first body or the second body.

The turbine engine of any preceding clause, wherein the combustor is coupled to the circumferential casing via a combustor arm that interfaces with a first flange formed on the combustor.

A combustion section for a turbine engine, the turbine engine having a deswirler assembly comprising a set of walls and a set of channels formed between adjacent walls of the set of walls, with at least one wall of the set of walls having a fuel channel, the combustion section having a centerline and comprising a circumferential casing defining an interior, a combustor having an annular liner located within the interior, the combustor having a combustion chamber, and a fuel nozzle opening to the combustion chamber, wherein the turbine engine has a fuel supply system located within the combustion section, the fuel supply system comprising the fuel channel and a set of fuel line branches, the set of fuel line branches fluidly coupled to and extending within the interior between the fuel channel and the fuel nozzle.

The combustion section of any preceding clause, wherein the deswirler assembly comprises a deswirler and a diffuser.

The combustion section of any preceding clause, wherein the diffuser comprises a set of diffuser walls and a set of diffuser channels, with at least a portion of the set of walls being provided within the set of diffuser walls.

The combustion section of any preceding clause, wherein the deswirler comprises a set of deswirler walls and a set of deswirler channels, with at least a portion of the set of walls being provided within the set of deswirler walls.

The combustion section of any preceding clause, wherein the fuel channel extends through the interior of the at least one wall.

The combustion section of any preceding clause, wherein the fuel supply system comprises an exterior plenum extending circumferentially about the centerline and opening to the fuel channel, the exterior plenum being located exterior of the interior.

The combustion section of any preceding clause, wherein the exterior plenum opens to two or more channels of the set of walls.

The combustion section of any preceding clause, wherein the exterior plenum extends continuously about greater than or equal to 25% and less than or equal to 100% of a circumferential extent of the centerline.

The combustion section of any preceding clause, wherein the fuel supply system comprises an interior plenum extending circumferentially about the centerline, the fuel channel opening to the interior plenum.

The combustion section of any preceding clause, wherein the fuel nozzle is included in a plurality of fuel nozzles, and the fuel supply system comprises set of fuel line branches extending from the interior plenum, with each fuel line branch of the set of fuel line branches extending between a respective portion of the interior plenum and to a corresponding fuel nozzle of the plurality of fuel nozzles.

The combustion section of any preceding clause, wherein the interior plenum extends continuously about greater than or equal to 25% and less than or equal to 100% of a circumferential extent of the centerline.

The combustion section of any preceding clause, wherein the fuel nozzle is included in a plurality of fuel nozzles.

The combustion section of any preceding clause, wherein the fuel channel is included in a plurality of fuel channels, and every other wall of the set of arcuate walls includes at least one fuel channel of the plurality of fuel channels.

The combustion section of any preceding clause, wherein the set of fuel line branches are coupled to the fuel nozzle at a set of joints being the only couplings between the fuel supply and the combustion section within the interior.

The combustion section of any preceding clause, wherein the deswirler assembly and the fuel supply are at least partially integrally formed.

The combustion section of any preceding clause, wherein the at least one wall is a heat exchanger configured to transfer a heat from a working airflow flowing over the at least one wall to a flow of fuel within fuel channel.

The combustion section of any preceding clause, wherein the combustion section comprises a combustor arm extending between the combustor and the circumferential casing.

The combustion section of any preceding clause, wherein the circumferential casing, the fuel supply system, and the deswirler assembly are integrally formed.

The combustion section of any preceding clause, wherein the combustion section comprises a compressed air passage formed between the circumferential casing and the combustor, with the deswirler assembly opening to the compressed air passage.

The combustion section of any preceding clause, wherein the fuel supply system is configured to supply a flow of gaseous hydrogen-containing fuel to the combustion chamber.

The combustion section of any preceding clause, wherein the fuel line branch extends from the fuel channel and to the fuel nozzle.

The combustion section of any preceding clause, wherein the fuel line branch has an attenuation distance, the circumferential casing has an inner circumferential casing that extends an axial distance, with the attenuation distance being greater than the axial distance.

The combustion section of any preceding clause, wherein the circumferential casing includes a first body and a second body.

The combustion section of any preceding clause, wherein the first body is coupled to the second body The combustion section of any preceding clause, wherein the deswirler is integrally formed with one of the first body or the second body.

The combustion section of any preceding clause, wherein the combustor is coupled to the circumferential casing via a combustor arm that interfaces with a first flange formed on the combustor.

What is claimed is:

1. A turbine engine comprising:
   a compression section, a combustion section, and a turbine section in serial flow arrangement and defining a working airflow path, the combustion section having a centerline and comprising:
   a circumferential casing defining an interior;
   a combustor having an annular liner located within the interior, the combustor having a combustion chamber; and
   a fuel nozzle opening to the combustion chamber;
   a deswirler assembly fluidly coupling the working airflow path of the compression section to the interior, the deswirler assembly comprising a set of walls and a set of channels formed between adjacent walls of the set of walls, with at least one wall of the set of walls defining a fuel channel; and
   a fuel supply system located within the combustion section and configured to supply a flow of gaseous hydrogen-containing fuel to the combustion chamber, the fuel supply system comprising the fuel channel and at least one fuel line branch, the at least one fuel line branch fluidly coupled to and extending within the interior between the fuel channel and the fuel nozzle.

2. The turbine engine of claim 1, wherein the deswirler assembly comprises a deswirler and a diffuser.

3. The turbine engine of claim 2, wherein the diffuser comprises a set of diffuser walls and a set of diffuser channels, with at least a portion of the set of walls being provided within the set of diffuser walls.

4. The turbine engine of claim 2, wherein the deswirler comprises a set of deswirler walls and a set of deswirler channels, with at least a portion of the set of walls being provided within the set of deswirler walls.

5. The turbine engine of claim 1, wherein the fuel channel extends through the interior of the at least one wall.

6. The turbine engine of claim 1, wherein the fuel supply system comprises an exterior plenum extending circumferentially about the centerline and opening to the fuel channel, the exterior plenum being located exterior of the interior.

7. The turbine engine of claim 6, wherein the exterior plenum opens to two or more channels of the set of walls.

8. The turbine engine of claim 6, wherein the exterior plenum extends continuously about greater than or equal to 25% and less than or equal to 100% of a circumferential extent of the centerline.

9. The turbine engine of claim 1, wherein the fuel supply system comprises an interior plenum extending circumferentially about the centerline, the fuel channel opening to the interior plenum.

10. The turbine engine of claim 9, wherein:
    the fuel nozzle is included in a plurality of fuel nozzles; and
    the at least one fuel line branch comprises a set of fuel line branches extending from the interior plenum, with each fuel line branch of the set of fuel line branches extending between a respective portion of the interior plenum and to a corresponding fuel nozzle of the plurality of fuel nozzles.

11. The turbine engine of claim 10, wherein the interior plenum extends continuously about greater than or equal to 25% and less than or equal to 100% of a circumferential extent of the centerline.

12. The turbine engine of claim 1, wherein the fuel nozzle is included in a plurality of fuel nozzles.

13. The turbine engine of claim 1, wherein the fuel channel is included in a plurality of fuel channels, and every other wall of the set of walls includes at least one fuel channel of the plurality of fuel channels.

14. The turbine engine of claim 1, wherein the set of fuel line branches are coupled to the fuel nozzle at a set of joints being the only couplings between the fuel supply and the combustion section within the interior.

15. The turbine engine of claim 1, wherein the deswirler assembly and the fuel supply are at least partially integrally formed.

16. The turbine engine of claim 1, wherein the at least one wall is a heat exchanger configured to transfer a heat from a working airflow flowing over the at least one wall to a flow of fuel within fuel channel.

17. The turbine engine of claim 1, wherein the combustion section comprises a combustor arm extending between the combustor and the circumferential casing.

18. The turbine engine of claim 1, wherein the circumferential casing, the fuel supply system, and the deswirler assembly are integrally formed.

19. The turbine engine of claim 1, wherein the combustion section comprises a compressed air passage formed between the circumferential casing and the combustor, with the deswirler assembly opening to the compressed air passage.

* * * * *